Nov. 21, 1967  W. L. BLACKBURN  3,354,393
MECHANICAL APPARATUS FOR SUPPORTING A MAGNETIC CORE
AND ELECTRICAL TEST CIRCUITRY THEREFOR
Filed May 18, 1964

INVENTOR.
WILLIAM L. BLACKBURN
BY Robert A. Green
ATTORNEY

United States Patent Office 3,354,393
Patented Nov. 21, 1967

3,354,393
MECHANICAL APPARATUS FOR SUPPORTING A MAGNETIC CORE AND ELECTRICAL TEST CIRCUITRY THEREFOR
William L. Blackburn, Laurel Springs, N.J., assignor to Burroughs Corporation, Detroit, Mich., a corporation of Michigan
Filed May 18, 1964, Ser. No. 368,174
3 Claims. (Cl. 324—158)

ABSTRACT OF THE DISCLOSURE

The disclosure is of a support member having an insulating pedestal which carries two spaced-apart conductive pins and which is adapted to carry a core to be tested, with the conductive pins extending vertically above the core and accessible to contact arms for making contact with the pins. Remote from the pedestal, two hollow support posts are mounted for rotation about a vertical axis on the support member. The support posts carry the aforementioned contact arms which are adapted to be rotated in a horizontal plane and are adapted to be brought into and out of engagement with the conductive pins to complete a test circuit. The test circuit includes conductive leads which extend from each conductive pin and each contact arm to remote test circuit instruments.

This invention relates to apparatus for testing toroidal magnetic cores and, particularly, to apparatus for both supporting and testing a magnetic core.

Magnetic cores are tested by applying an electrical signal to the core and examining the corresponding output signal. Generally, the test apparatus comprises a suitable support for the core and means for applying and extracting the aforementioned electrical signals. In the past, when magnetic cores were relatively large in diameter, the test support apparatus was relatively simple to construct. However, with the advent of very small-diameter cores, for example, cores of approximately 20 mils in diameter, problems have arisen in the support for the cores and in the electrical contacts for applying signals thereto.

Accordingly, the principles and objects of the invention concern the provision of improved apparatus for supporting and testing small-diameter magnetic cores.

Figure 1:
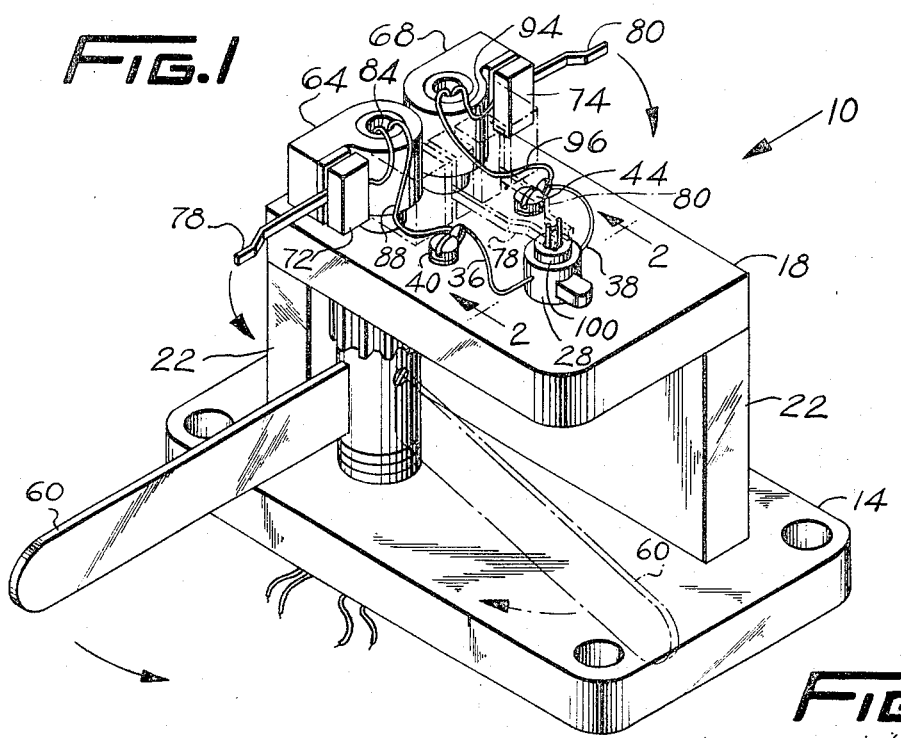
FIG. 1 is a perspective view of the apparatus of the invention showing the apparatus in one stage of operation.
Figure 2:
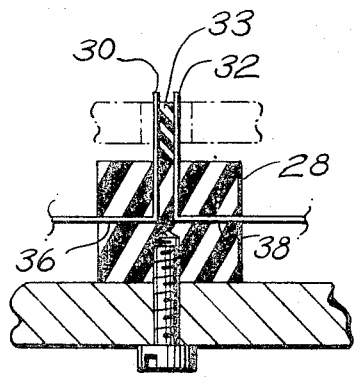
FIG. 2 is a sectional view along the lines 2—2 in FIG. 1.
Figure 3:
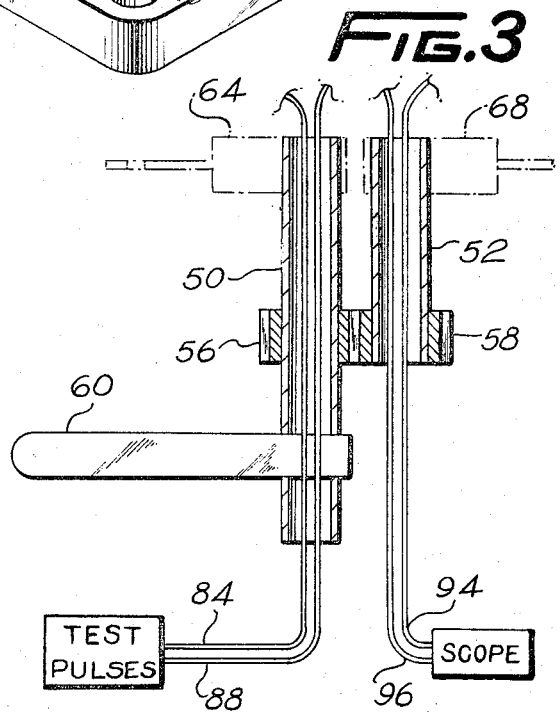
FIG. 3 is a fragmentary front elevational view of the apparatus shown in FIG. 1.

The apparatus 10 includes a first support base 14 and a second support base 18 elevated from the first and suitably secured thereto, for example, by means of one or more walls or posts 22. On the second support base 18 there is mounted an insulating post 28, on which a pair of test pins 30 and 32 are provided. The test pins are intended to receive a toroidal magnetic core to be tested, with the core being threaded over the pins. The pins are supported close together with suitable insulating material between them. The two pins extend into the body of the insulating post 28, and, within this body, the pins are connected to leads 36 and 38 which extend laterally through the insulating post. Outside the insulating post, the leads are coupled to suitable terminals 40 and 44 secured to the second support base 18.

A pair of posts 50 and 52 are rotatably mounted in suitable bearing surfaces in the second support base 18. Below the support base 18, the posts 50 and 52 are provided with meshing gears 56 and 58, respectively, and one post is provided with an operating handle 60 which is used to rotate the posts in opposite directions with respect to each other. The posts are preferably hollow in construction. Above the second support base 18, the posts 50 and 52 are provided with brackets 64 and 68 which may be of metal, to each of which is secured a pad of insulating material 72 and 74 such as polyethylene, Teflon, or the like. In each insulating pad is embedded a relatively rigid contact arm 78, 80 of a length sufficient to make contact with the pins 30 and 32, respectively.

The electrical portion of the apparatus includes two leads 84 and 88 extending upwardly through post 50 and two similar leads 94 and 96 extending upwardly through post 52. At one end, the leads 84 and 94 are electrically connected to the contact arms 78 and 80, respectively. The other ends are connected to a source of driving test pulses or the like. Leads 88 and 96 are electrically connected at one end to terminals 40 and 44, respectively, and their other ends are connected to test monitoring apparatus such as an oscilloscope.

In operation of the apparatus of the invention, a toroidal core 100 to be tested is threaded over the support pins 30, 32 so that it rests on the insulating post 28. This operation is performed with the posts 50, 52 rotated so that the contact arms 78 and 80 are spread apart. The operating handle 60 is then operated to rotate the posts and to bring the contact arms into contact with the pins. The two circuits are now completed by applying driving signals to the core and evaluating the state or quality of the core by the resulting signal appearing in the second circuit coupled to the monitoring apparatus.

The apparatus 10 of the invention has the advantages that it is simple in construction and operation, and it can accommodate cores of different sizes including very small-diameter cores. In addition, there is no wear of parts in the making and breaking of electrical contacts.

What is claimed is:
1. Magnetic core testing apparatus comprising
a horizontal support plate,
an insulating support member mounted vertically on said support plate,
a pair of conductive pins mounted in said insulating support member and extending vertically therefrom, said pins being insulated from each other and adapted to be threaded through a toroidal magnetic core with the core seated on the insulating support post,
a pair of hollow insulating support posts mounted for rotation about vertical axes on said support plate remote from said insulating support member,
a contact arm secured to each support post and extending horizontally therefrom,
a first pair of conductive leads extending one from a contact arm and one form a conductive pin through the one hollow post for connection to test circuitry and a second pair of conductive leads extending one from the other contact arm and one from the other conductive pin through the other hollow post for connection to test circuitry, said contact arm being rotatable in horizontal planes by said support posts into and out of contact with said conductive pins whereby two conductive test loops are provided for applying signals to and extracting signals from the magnetic core under test.

2. The apparatus defined in claim 1 and including an operating handle secured to one of said support posts for rotating said posts.

3. The apparatus defined in claim 1 wherein said support posts carry meshing gears and including an operating handle coupled to one post for rotating said posts.

References Cited
UNITED STATES PATENTS 2,711,509  6/1955  Endres _____ 324—34

RUDOLPH V. ROLINEC, *Primary Examiner.*

E. L. STOLARUN, *Examiner.*